(12) United States Patent
Howorka

(10) Patent No.: US 8,335,737 B2
(45) Date of Patent: Dec. 18, 2012

(54) PRICE IMPROVEMENT IN ELECTRONIC TRADING SYSTEM

(75) Inventor: Edward R. Howorka, Denville, NJ (US)

(73) Assignee: EBS Group Limited, London (GB)

( * ) Notice: Subject to any disclaimer, the term of this patent is extended or adjusted under 35 U.S.C. 154(b) by 320 days.

(21) Appl. No.: 12/774,878

(22) Filed: May 6, 2010

(65) Prior Publication Data

US 2010/0241555 A1   Sep. 23, 2010

Related U.S. Application Data

(62) Division of application No. 11/197,329, filed on Aug. 5, 2005, now Pat. No. 7,742,975.

(60) Provisional application No. 60/598,988, filed on Aug. 5, 2004.

(51) Int. Cl.
*G06Q 40/00* (2012.01)
(52) U.S. Cl. .................................. 705/37; 705/36 R
(58) Field of Classification Search .............. 705/36 R, 705/37
See application file for complete search history.

(56) References Cited

U.S. PATENT DOCUMENTS

| | | | |
|---|---|---|---|
| 5,375,055 A | 12/1994 | Togher et al. | |
| 6,282,521 B1 | 8/2001 | Howorka | |
| 6,850,907 B2 | 2/2005 | Lutnick et al. | |
| 6,963,856 B2 | 11/2005 | Lutnick et al. | |
| 7,392,214 B1 | 6/2008 | Fraser et al. | |
| 7,398,244 B1 | 7/2008 | Keith | |
| 7,496,533 B1 | 2/2009 | Keith | |
| 7,539,638 B1 | 5/2009 | Keith | |
| 7,613,650 B2 | 11/2009 | Smith et al. | |
| 7,644,027 B2 | 1/2010 | Keith | |
| 7,941,364 B2 * | 5/2011 | Peterffy et al. | 705/38 |
| 8,019,672 B2 * | 9/2011 | Sweeting et al. | 705/37 |
| 2001/0042040 A1 | 11/2001 | Keith | |
| 2001/0044770 A1 | 11/2001 | Keith | |
| 2001/0051909 A1 | 12/2001 | Keith | |
| 2002/0010673 A1 | 1/2002 | Muller et al. | |
| 2002/0091617 A1 | 7/2002 | Keith | |
| 2002/0169703 A1 | 11/2002 | Lutnick et al. | |
| 2003/0149636 A1 | 8/2003 | Lutnick et al. | |
| 2004/0034591 A1 | 2/2004 | Waelbroeck et al. | |
| 2004/0059666 A1 | 3/2004 | Waelbroeck et al. | |
| 2004/0210511 A1 | 10/2004 | Waelbroeck et al. | |
| 2004/0243505 A1 | 12/2004 | Sweeting et al. | |
| 2004/0254804 A1 * | 12/2004 | Peterffy et al. | 705/1 |
| 2005/0160032 A1 | 7/2005 | Lutnick et al. | |
| 2006/0020536 A1 | 1/2006 | Renton et al. | |
| 2006/0069637 A1 | 3/2006 | Lutnick et al. | |
| 2006/0229967 A1 | 10/2006 | Sweeting | |

FOREIGN PATENT DOCUMENTS

| | | |
|---|---|---|
| EP | 0 399 850 A2 | 11/1990 |
| GB | 2389687 A | 12/2003 |
| WO | WO-01/57752 A1 | 8/2001 |
| WO | WO-01/98959 A2 | 12/2001 |
| WO | WO-01/98960 A2 | 12/2001 |
| WO | WO-2004/045214 A1 | 5/2004 |

* cited by examiner

*Primary Examiner* — Jagdish Patel
*Assistant Examiner* — Sara C Hamilton
(74) *Attorney, Agent, or Firm* — Dickstein Shapiro LLP

(57) ABSTRACT

Price improvement in credit screened trading systems is achieved by entering a maximum price improvement (MPI) amount with a maker quote. The system prepares separate quote queues for each trading floor including only quotes where bilateral credit exists. Quotes are arranged using Price, MPI, time priority. When a quote is dealt, a dealable price improvement is calculated as the amount of the MPI required to improve the dealt quote's position in the queue.

17 Claims, 2 Drawing Sheets

| Bid | MPI | DPI |
|---|---|---|
| A | 4 | 2 |
| H | 4 | 2 |
| D | 3 | 1 |
| E | 3 | 1 |
| B | 1 | 0 |
| C | 1 | 0 |
| F | 1 | 0 |
| G | 0 | 0 |
| I | 0 | 0 |

| Bid | Price | MPI | DPI | Time submitted | Amount |
|---|---|---|---|---|---|
| C | 1.2345 | 3 | 1 | 01:23:45 | 2M |
| A | 1.2345 | 0 | 0 | 01:23:30 | 2M |
| B | 1.2345 | 0 | 0 | 01:23:35 | 2M |

Figure 2

| Bid | MPI | DPI |
|---|---|---|
| C | 3 | 1 |
| A | 0 | 0 |
| B | 0 | 0 |

Figure 3

| Bid | MPI | DPI |
|---|---|---|
| A | 4 | 2 |
| H | 4 | 2 |
| D | 3 | 1 |
| E | 3 | 1 |
| B | 1 | 0 |
| C | 1 | 0 |
| F | 1 | 0 |
| G | 0 | 0 |
| I | 0 | 0 |

Figure 4

| Bid | MPI | DPI |
|---|---|---|
| A | 4 | 1 |
| D | 3 | 1 |
| B | 1 | 0 |
| F | 1 | 0 |
| I | 0 | 0 |

Figure 5

PRICE IMPROVEMENT IN ELECTRONIC TRADING SYSTEM

CROSS-REFERENCE TO RELATED APPLICATIONS

This application is a divisional of U.S. application Ser. No. 11/197,329, filed Aug. 5, 2005, which claims benefit under 35 U.S.C. 119(e) to U.S. Provisional Patent Application No. 60/598,988, filed Aug. 5, 2004, the entirety of each of which is incorporated by reference herein.

FIELD OF THE INVENTION

This invention relates to electronic trading systems, and in particular to the use of price improvement (PI) in electronic trading systems. It is particularly concerned with price improvement in systems in which different trading parties see different versions of the market due to factors such as credit.

BACKGROUND OF THE INVENTION

Price improvement has been used in the financial markets for many years and refers to the filling of an order at a price between than that bid or offered. Price improvement is used extensively in the equities trading market.

From the point of view of the taker, sometimes referred to as the active trader or aggressor, price improvement occurs when the taker receives a better than requested price. In an equities market this may he due to the order being fulfilled through a source that is prepared to trade at better-than-market price, for example to improve their order flow.

A version of taker price improvement is implemented as an anonymous trading system operated by EBS Dealing Resources, Inc of New York USA to trade foreign exchange spot and precious metals. The EBS system, which is used very widely in the Interbank market, considers taker orders to be limit orders. This means that they are considered to be buy-up-to or sell-down-to orders rather than buy-at or sell-at orders. When the system finds a match, and there is a difference between buying and selling price, the difference is given to the taker. Done deals are displayed to the taker in a deals panel on their workstation and a price improved deal is indicated by an icon (a smiley "☺") next to the deal as shown below:

| Time | Buy/Sell | Amount (Million) | Rate | | Deal Code | CCY |
|---|---|---|---|---|---|---|
| 21.13 | Buy | 1 | 1.8331 | ☺ | XPBX | GBP/USD |

Price improved deals occur frequently when the market is busy and volatile.

From the point of view of the maker, or passive trader, price improvement occurs where the maker improves the price of a quote, that is a bid is increased or an offer price decreased, slightly to increase the chances of getting dealt. An example of maker price improvement is a system operated by eSpeed Inc of New York USA and described in GB-A-2,389,687. The eSpeed system allows the maker to improve his price by a range of pip fractions, called PI increments. Other traders can tell a price improved order by a PI icon (a diamond) displayed next to the order. A party who includes price improvement in their order is referred to as the PI contributor while a party acting on a PI price is referred to as the PI recipient. Both parties benefit as the PI contributor is increasing their chances of being dealt and the PI recipient is getting a better price by acting on the PI order.

The eSpeed system includes a PI best feature which allows the maker to use PI only when necessary to improve their probability of execution. This enables a maker to maximise the likelihood of securing a trade with the minimum number of PI increments possible.

The eSpeed system as disclosed in GB 2,389,687 defines price improvement as a price that is improved over a touch price. In the eSpeed system, a market moves from a bid/offer state to a trade state when a trader hits or lifts a bid/offer posted by another trader. That hit/lift price becomes the touch price of the market for the selected item and the market becomes active for that item. A price improved bid/offer has a price that is improved with respect to that touch price. The touch price is a price that is seen by all traders in the market.

Once a price improved order has been dealt, the eSpeed system distributes at least a portion of the difference between the touch price and the price-improved order price between the parties to the trade and the system host.

A further example of price improvement in electronic trading systems is disclosed in WO2004/045214 of Boston Options Exchange. This application discloses conducting rapid automated auctions in which participants can provide price improved orders. As with the eSpeed system, the price improvement increment is smaller than the minimum price variation of the instrument being traded. Price improved orders may be submitted during a limited time period and are defined as an improvement over the best bid or offer prevailing across multiple markets for the particular instrument. This is similar to the concept of touch price, an established market price for an instrument that is visible to and dealable by all traders in the market place.

Although the idea of implement price improvement is attractive to the foreign exchange markets, the technical solutions proposed in WO04/042514 and GB-A-2,389,687 are unworkable in the Interbank foreign exchange (FX) markets as the concept of a touch price does not exist.

Unlike the equities markets, the dealable price that is available to an F/X trader varies depending on the credit relationship the taker's trading floor has with other trading floors of currently active market makers. A quote submitted by a maker that has no bilateral credit with the taker will be filtered out by the system and not shown to the taker. It will, however, be shown to any other taker that has bilateral credit with the maker's trading floor. Thus, the market view seen by a trading floor is specific to that trading floor and dependent on that trading floor's credit relationships. The manner in which prices are credit-filtered prior to distribution to trading floors is described in U.S. Pat. No. 5,375,055 (Togher et al.).

From a maker's perspective, a quote submitted on the EBS system might be the best quote, and first in line to be dealt, on almost all trading floors in the system, even though it is worse than both his dealable price an the best price on the system, which could be entered by a party to whom few trading floors extend credit.

Thus, a marker at a large bank may see a dealable price of 33-34 (bid-offer) on his EBS display but could submit a bid of 32 and be dealt immediately, even though his dealable price remains unchanged. In this case the 33 dealable bid price was submitted by a smaller bank that has credit with a limited number of floors. Many traders in the system saw a dealable price of only 31-34 and a best price (which is not credit screened) of 33-34. This makes the makers bid of 32 attractive and it was taken immediately. This situation is common in credit screened markets and illustrates that there is no concept of a market touch price and so no possibility of price improvement with respect to touch price.

A maker is always uncertain of the position in the queue of his quote as he is necessarily unaware of the whole market in a credit screened system. There are ways in which the maker can gain information. The first is by looking at the done deals on the makers display. This shows all deals that have been executed on the system regardless of credit relationships and by observing where other trades are taking, the maker may gain an indication of the proper quoting level. The deals panel shows lowest bid that was taken by a single sell order, the lowest sell that was dealt in a single time slice etc. Thus, in the above situation, the trader would see from his deals panel that a number of trades had been "given" at 31. From this the trader could deduce that a dealable bid of 33 was not being seen, and so not available to some or all of the market.

The second technique is described in U.S. Pat. No. 6,282, 521 and is implemented on the EBS trading system and is referred to in the market as "red quote". The system notifies the maker when the maker's quote is close to the head of the queue at a significant percentage of the trading floors by turning the quote display red. In the example above, the 32 bid would turn red even though it is worse than the dealable price displayed on the maker's workstation.

Thus, although it is desirable to implement price improvement on a credit screened trading system, there is no available mechanism for doing so due to the absence of a touch price and the distribution of different dealable prices to different trading floors. Furthermore, for price improvement to be attractive to users the system must only apply it when it is necessary.

SUMMARY OF THE INVENTION

The present invention aims to address these essentially technical problems to enable price improvement to be implemented on a credit screened trading system.

Broadly, the present invention provides a method and apparatus for providing price improvement which can be used on either credit-screened or non-credit-screened trading systems.

The invention resides in the use of bid and offer orders submitted with a maximum price improvement, being the maximum amount of price improvement needed to improve a quote's position in a queue of quotes to be dealt. Once a taker hit has been found to deal the quote, a second measure of price improvement, the dealt price improvement can be calculated. The dealt price improvement is the amount of the maximum price improvement that is actually needed to improve the quotes position in the queue. This may range from zero to the full amount of the maximum price improvement indicated by the maker.

In a non-credit screened system, where all quotes are available to all potential takers, the dealt price improvement (DPI) will be the same for all takers. However, in a credit-screened market, individual quote queues are prepared for each trading floor on the basis of their credit, bilateral or otherwise, with maker quotes. Thus, each taker trading floor's quote queue will be a subset of the entire quote queue. As a result, the DPI of a particular dealt quote will depend on the identity of the taker and the quotes in their taker queue. This is so as the amount of price improvement will depend on what other quotes are in the taker trading queue at the same price and so how much price improvement is required to improve the position in the queue with respect to their quotes.

Specifically, the invention is defined by the independent claims to which reference should be made.

The price at which the dealt quote is executed is preferably the quote price plus the DPI. The DPI is preferably calculated in price improvement units, a unit being a fraction of the smallest increment of the fungible being traded.

Embodiments of the invention may be used in any trading system trading any fungible. It is particularly advantageous for trading financial instruments such as, but not limited to, foreign exchange currency pairs. Such trading systems may be anonymous or an open system in which the identity of makers and takers is known prior to execution.

The dealable price improvement may be calculated only for the best quote in a queue or for all quotes in the queue. The dealable price improvement may be calculated as the number of time inverted quotes in the quote queue at the same price, a time inverted quote being a quote higher in the queue than an earlier submitted quote at the same price.

The quote queue may comprise a separate bid queue and offer queue.

In credit-screened electronic trading systems it is customary to charge the taker a fee. Makers are not charged thereby encouraging makers to enter quotes and increase the liquidity of the system. Preferably, makers are charged as if they were takers where a price improved quote is dealt. Preferably a flat fee is charged to the maker by the system operator.

The DPI of a quote is preferably determined only from the quote and other quotes following the quote in the quote queue. The magnitude of the DPI is dependent only on the identity of the trader taker floor, and even this will not be relevant where there is no quote screening. The magnitude of the DPI is independent of the volume of the trade conducted between the maker and taker.

The trading system preferably comprises a market distribution function which calculates market views for each trading floor. The market distribution function preferably also calculates the dealable price of a quote.

The market distribution function may distribute only the best quote of the quote book for each trading floor, or may distribute only the best few quotes of each trading floor trader queue. The display to traders of a quote submitted with an indication of a maximum price improvement is differentiated from that of quotes having no maximum price improvement indication. Preferably, this differentiation takes the form of an icon displayed proximate the quote.

BRIEF DESCRIPTION OF THE DRAWINGS

Embodiments of the invention will now be described, by way of example, and with reference to the accompanying drawings, in which:

FIG. 2 is a view of a bid queue including a price improved bid;

FIG. 3 is a simplified view of the queue of FIG. 2;

FIG. 4 is a view of a more complex bid queue; and

FIG. 5 is a view of the bid queue of FIG. 4 after credit filtering.

DESCRIPTION OF PREFERRED EMBODIMENTS

Figure 1:
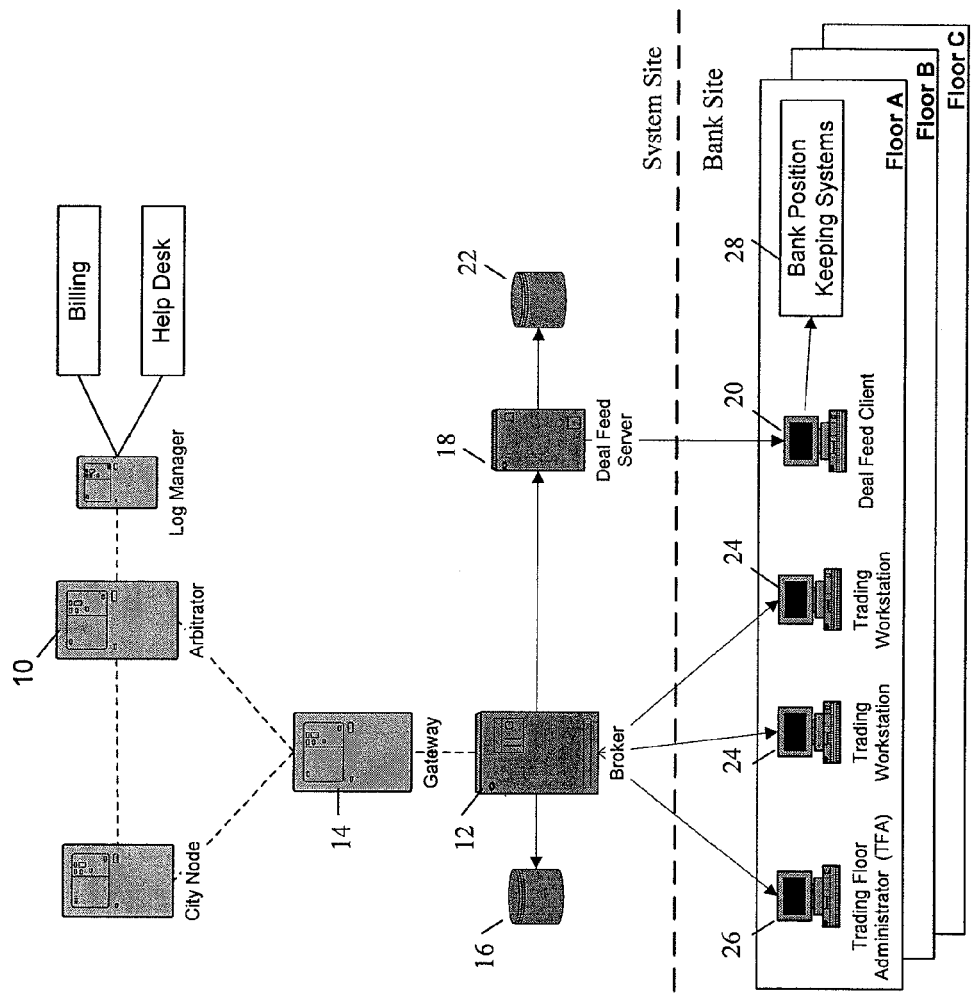
FIG. 1 is a schematic view of a system on which the present invention may be implemented.

The method and system to be described is suitable for implementation on any credit screened trading system. Various examples exist in the art of such systems, including EP-A-399850 of Reuters Ltd, which discloses a centralised host system in which traders communicate via trader workstation computers with a host computer which holds credit, performs order matching and executes deals. U.S. Pat. No. 5,375,055 mentioned above discloses a distributed matching system in which matching takes place at arbitrator computers but actual credit limits are held at bank node computers through which trader workstations communicate with the system. A yes/no credit matrix is stored at market distributor computers arranged between the bank nodes and the arbitrators and which are responsible for credit filtering of quotes on the basis of the credit matrix and for the formation and distribution of market views to trading floors. A further example is disclosed in WO01/98960 which describes a distributed system using a network of broking node computers in which each broking node computer combines matching, market distribution and deal execution functionality. Hybrid systems also exist in which the broking node computer concept is incorporated into the distributed system of U.S. Pat. No. 5,375,055. Such a system is shown in FIG. 1 in which an arbitrator computer 10 communicates with a broking node computer 12 via a gateway computer 14. The broker communicates with a store 16, a deal feed server 18 and with trading floors. The deal feed server feeds details of completed deals to deal feed clients 20 at the relevant trading floors as well as storing them at a local store 22. The deal feed clients in turn communicate with back position keeping systems 28. Individual trading workstations 24 at trading floors communicate directly with the broker 12 as does the trading floor administrator terminal (TFA) 26 for each trading floor. The broker 12 performs the same function as the market distributor and local bank nodes of the distributed system of U.S. Pat. No. 5,375,055 and is responsible for processing price distribution, order/hit submission, deal status/notification, trader profile information, entitlements, credit limits and settlement instructions. The price improvement calculation embodying the present invention is performed at the broker. The embodiments of the present invention are not limited to any particular architecture and may be implemented on the systems described above and on other systems.

In the following description, a number of assumptions are made as to the functionality of price improvements. Thus, the price improvement mechanism enables market makers to specify a maximum price improvement (PI) for a quote, and to modify this maximum PI after a quote has been submitted.

The system calculates the actual deal price improvement in the way most beneficial to the maker. Thus, if the maker's quote is the only one available to the taker, the taker receives no improved price by taking the quote regardless of whether the maker had price improved the quote. In general, the system restricts the degree of price improvement to that necessary to increase the quote's dealing priority.

The system indicates when a price improved best dealable price is available to a taker. This indication may be by an icon such as the ☺ presently used or by some other indication such as the best dealable price being presented in a different colour. The actual dealable price improvement may be indicated on the price panel.

The following discussion introduces the concepts of maximum price improvement (MPI) and dealable price improvement (DPI). MPI is the maximum price improvement that can be applied to a quote submitted into the trading system. This may be selected by the trader within set boundaries defined by the system operator. The MPI is an attribute of the quote and may be changed at any time after quote submission of the system rules permit such changes. In the foreign exchange (FX) market, prices are expressed in terms of pips which represent the least significant digit or digits of the price. Thus, in the example given in the introduction, a bid of 31 may actually be a bid of 1.8131 in an GBP/USD market. It is the pips that are of interest to traders as it is these that change in the market. The price improvement unit for a given currency pair is a small fraction of the smallest usual trading price increment (1 pip). It is preferred that this small increment is between 0.1 and 0.01 of a pip. Thus, for GBP/USD, where the minimum increment is 0.0001, or $1/100^{th}$ of a cent, the price improvement unit is typically between $1/1000^{th}$ to $1/10,000^{th}$ cents.

MPI represents the maker's willingness to pay up to that price improvement to secure a deal. The system's dealing rules minimise the actual dealable price improvement. Thus, DPI is the actual price improvement that was required to improve the quote to have it dealt in preference to other quotes.

It is usual for quotes in FX anonymous trading systems to be dealt by price/time priority. This means that in considering which quote should be dealt, price is the determining factor. Where prices are the same, the earliest submitted quote takes precedence. In the present embodiment, quotes are ordered in the market book by quote price, maximum price improvement and price submission time. Thus, there is price/MPI/time priority. This means that where two prices are the same, the price with the greater MPI will take precedence in the order book even if it is the later of the two quotes. Quotes are therefore ordered by the maker's willingness to improve the price and then by submission time.

When a taker submits an order, the system matches the order in the same manner as the existing system but using price/MPI/time priority. When a match is made, and a deal initiated as a result of the match, or an actual dealable price needs to be determined for other reasons, such as display, the system determines how much of the MPI needs to be used in order to match or deal the specified quote in the specified position in the order queue. This amount is the DPI.

The manner in which DPI is calculated minimises the necessary price improvement. As, contrary to the eSpeed model described in GB 2,389,687, the cost of price improvement is borne entirely by the maker, it is important to minimise the cost of price improvement within the maximum boundary of the MPI set by the maker.

Although the embodiment described is particularly suited to a credit screened environment, it is also applicable to a non-credit screened environment. The following example, for the sake of simplicity, assumes no credit screening. Within a credit screened environment this is the same as all trading floors granted credit to each other.

For a quote "Q" in the price/MPI/time ordered quote book, the DPI of the quote is calculated as follows:

1. If a quote following Q has a worse price, the DPI of Q is zero. Q will be the last quote in the queue at this price level.
2. Otherwise, if the time of the next quote is greater or equal to the time of Q, then the DPI of Q is the same as the DPI of the next quote.
3. Otherwise, the DPI of Q is equal to the DPI of the next quote plus one PI unit.

This definition is recursive in that it defines DPI in terms of the DPI of the next quote. An equivalent non-recursive definition states that the DPI of a quote is equal to the number of time inversions behind the quote at the same price level. A time inversion occurs when a quote with a higher MPI immediately precedes a later quote with a lower MPI.

This approach to calculation of DPI will now be explained with respect to FIGS. 2 to 5. in these examples, the currency pair being traded is Euro/US Dollar (EUR/USD) and the price improvement unit is set at $1/10$ pip or 0.00001 cents. This may be expressed as $10 per 1 million Eur. The system sets the PI that can be added by the market to between 0 and 4 PI units.

FIG. 2 shows three bids A B C in a queue. Each bid has a price, an MPI, a DPI, a submission time and an amount. The maker submitting bid C has included a MPI of 3 PI units. The price and amounts of the bids are the same and, chronologically, the bids are received in the order A, B and C. Ordinarily, using price time priority, the order in the queue would be A, B then C. However, as bid C is price improved, with an MPI of three it is placed ahead of A and B at the top of the queue. Bids A and B have an MPI of zero indicating that their submitters did not wish to take advantage of price improvement.

To calculate the DPI of each bid, one must start at the bottom of the queue and work upwards using rules 1 to 3 set out above. From Rule 1, DPI (B)=0 as all following quotes have a worse price—it is the last quote in the queue at this price level. From rule 2, DPI (A)=0 as the time of quote B, the next quote is greater than the time of quote A. Thus, DPI (A)=DPI(B)=0.

From rule 3, it can be determined that DPI(C)=1 PI unit as DPI (C)=DPI(A)+1 PI unit.

Using the non-recursive definition, it can be seen that there is only one time inversion, between quotes C and A which again gives a DPI of 1. It can be seen that the DPI of a quote equals the number of time inversions behind the quote at the same price level.

Thus, the actual deal price of C is:

$$1.2345 + 1 \text{ PI} = 1.2345 + 0.00001 = 1.23451$$

The transaction cost to the maker is 10 EUR per million USD plus transaction cost.

For calculating DPI one only needs to consider quotes at the same price level. In the following examples, shown in FIGS. 3 to 5, the amounts and prices are omitted. Submission times are also omitted and submission order indicating using ascending lettering A, B, C etc. These inversions are indicated by a thick line between quotes. Thus, the example of FIG. 2 can be simplified down to that of FIG. 3 which shows a thick line between quotes c and A indicating a time inversion.

FIG. 4 shows a more complex example with 9 quotes received chronologically in the order A to I. Quotes B, C and F have an MPI of I, quotes D and E have an MPI of 3 and quotes A and H have an MPI of 4. Quotes B, C and F do not improve their position in the queue as the only quotes that have a lower MPI were received later. Quotes D and E were received after quotes B and C but have a greater MPI so precede those quotes. Quote A was received first and has the highest MPI and so remains at the top of the queue and quote H was the penultimate quote received but is placed second in the queue as it has a higher MPI than all quotes other than A.

Using rules 1 to 3 it can be seen that quotes B, C, F, G and I have a DPI of 0, quotes D and E have a DPI of 1 and quotes A and H have a DPI of 2. It follows that rule 1 requires that DPI (I)=0 and rule 2 requires that DPI (B,C,F)=0. DPI (E)=1 by rule 3 and so DPI (D)=1 by rule 2. Similarly DPI (H)=2=DPI (D)=1 PI and DPI (A)=DPI (H)=2.

The following characteristics of DPI calculation can be drawn form the above examples.

1. The ordering of the quote queue by price/MPI/time is identical to price/DPI/time. The dealt order including DPI must be strictly dealt-price/time but the conversion from MPI to DPI does not affect a quote's order in the queue.
2. The DPI of a quote can be calculated from the knowledge of that quote and following quotes only. Knowledge of quotes higher up the queue is not necessary. This may be thought of as the maker paying to improve his position in the queue.
3. A quote's DPI is independent of the size of a potential take. This enables the DPI to be calculated statically by examining the dealable quote queue. It is irrelevant to the calculation of DPI whether the quote is dealt in a single transaction or a series of smaller transactions. This property enables the DFPI value to be displayed to takers next to the dealable price.
4. Similarly, a quote's DPI does not depend on the size of the quote itself, or on the size of quotes either side of it in the quote queue. Thus, if a quote is partially dealt, the DPI should remain the same. Two quotes submitted for smaller amounts should have the same DPI as are large quote.
5. A quote's DPI depends only on other quotes at the same nominal (i.e. non price-improved) price. The presence or absence of quotes at strictly better or worse prices is irrelevant to the quote DPI. This follows as the object of PI is to enable a maker to get ahead of other quotes at the same price. At the time of matching, the price of the matched quote is always the best possible so that a non-price improved quote will be matched instead of price improved quote if the price improved quote is at a worse nominal price.
6. A quote's DPI depends on the relative time order of quotes rather than the absolute times or magnitude of time intervals between quotes.
7. DPI can be calculated for quotes at all price levels and not just the best price.

The foregoing discussion has considered DPI and MPI in a non-credit screened environment for the sake of simplicity. The technique is also suitable for application to credit screened markets. In such a market, each trading floor can only deal on the subset of the global market book consisting of dealable quotes. These quotes form a dealable queue which is a sub-queue of the global queue as the global queue is determined by price/MPI/time.

The dealable queues are formed by the trading system and distributed to the trading floors. In the EBS systems this may be a market distributor or a market view calculation and distribution function within a broker node such as shown in FIG. 1. Alternatively, it could be performed at a host computer in a centralised system.

Referring back to the example of FIG. 1, quotes are submitted into the system by maker trading stations. In practice, any of the trading work stations 24 may act as a maker or trading work station. The details of the bid or offer quote are entered by the trader in the normal manner but, if desired, the trader also includes a maximum price improvement. The maker or taking trading stations could also be programmed automated trading interfaces. In the FIG. 1 embodiment, the broker 12 acts as a quote processor, forming the queues of bids and offers on a price/MPI/time priority and is responsible for preparing individual quote books for each trading floor which it distributes to the trading floors. In this respect it acts as a market distributor. Matching of quotes are performed by the arbitrator 10, which may be one of a plurality of geographically distributed arbitrators. Either the arbitrator or the broker may be responsible for deal execution. The broker includes a price improvement calculation which calculates dealt price improvement on the basis described above and communicates the dealt price and the dealt price improvement to the parties via the deal feed server and to the system.

The dealt price improvement calculator may calculate the DPI for each quote in the queue or just for the dealt quote. In a non-screened system the DPI for a quote will be the same for all takers, whereas, in a screened system, where some quotes are filtered from some taker traders based on a parameter such as credit, the DPI will depend on which taker takes the quote.

The DPI calculation method for a credit screened market is the same as that described above for a non-credit screened market except that a separate calculation of DPI must be made for each taker floor as it is applied in relation to the dealable queue available to that floor which is dependent on that floor's allocation of credit to and from other trading floors.

The manner in which DPI can change from floor to floor within the same market can be seen from a consideration of FIG. 4. Here it is assumed that the same quotes A to H are in the market at the same price as shown in FIG. 3. However, this trading floor only has a bilateral credit relationship with every second quote in the queue. Thus, the floor will only see quotes A, D, B, F and I with quotes H, E, C and G being screened out.

The MPI of the remaining quotes is the same as before, as this is a value chosen by the maker, but the DPI may change. In this example, the DPI of quote DPI (A)=1 as opposed to 2 in the previous example. As can be seen from FIG. 4, there is only one time inversion as bid H is no longer displayed to the taker in question. Thus, the DPI for an individual taker floor depends on the credit extended to and by that trading floor. A maker submitting a price improved quote will not be able to tell how much price improvement—how many PI units—will be required to deal the quote, as this will depend on the taker who hits the quote and that taker's credit environment. However, the MPI is not a measure of actual price improvement but an indication of how much price improvement the maker is willing to offer. The amount paid will depend on the market view of the trading floor that hits the price improved quote.

Price improvement as described above benefits the maker as it enables a maker's quote to ascend the quote queue and become more readily dealt. The cost of price improvement is borne by the maker who either increases his bid price or decreases the sell price. The taker does not pay to deal a price improved quote but benefits by having to pay less of sell at a higher price. Within existing FX spot systems, takers are charged on a per-trade basis but makers are not charged, so encouraging makers to put quotes into the system and improve liquidity. In return for the benefits to the maker of price improvement it is desirable to charge the maker a fee for using the price improvement functionality. This may be handled by a billing module within the trading system.

It will be appreciated that matching of quotes is performed in the same way as if price improvement was not used. Thus, no alteration to matching rules is required. The actual DPI calculation need not be performed until a deal is actually initiated. The price distribution system needs to perform a DPI calculation ever time slice, that is every time market views are calculated for each trading floor. The amount of calculation will depend on the amount of market depth that is to be shown to the takers. As mentioned above, this is conveniently performed by the market distribution functionality. Although not limited to credit screened trading systems, it will be appreciated that the embodiment described provides a mechanism for providing price improvement in credit screened systems. This is highly advantageous as it allows makers to pay a fee, and a premium, in return for an increased likelihood of their quote being dealt. The method described solves the problems associated with the prior art discussed above by introducing two calculations of price improvement: MPI which is an indication of willingness to price improve by the maker, and DPI which is an indication of the amount of PI required for a given taker such that the actual price improvement paid will depend on which taker hits the quote. Price improvement is determined not by a touch price but with respect to other quotes submitted at the same price that, in a credit screened market, are dealable by a given trader.

Various modifications to the embodiment described are possible and will occur to those skilled in the art without departing from the invention. For example, although the invention has been described in terms of FX trading systems, it is applicable to the trading of any fungible including, but not limited to, foreign exchange products including, spot, outrights, forwards, options, derivatives; equity products and other financial instruments, commodities and derivative commodity products. Although particularly suited to credit screened markets, embodiments of the invention are also applicable to non-credit screened markets. Whilst credit screened markets are often anonymous, there is less need for anonymity in non-credit screened markets. The invention may be used in both anonymous and non-anonymous systems. The invention is limited only by the following claims.

The invention claimed is:

1. An electronic trading system for trading fungibles between maker traders and taker traders, comprising:
a quote processor configured to receive submitted quotes from maker trading stations, the submitted quotes including a quote price and a maximum price improvement, and form a credit-screened queue of dealable quotes to be dealt prioritized in order of quote price, maximum price improvement and quote submission time;
a matching engine configured to match maker quotes with takes and execute deals between makers and takers; and
a computerized price improvement calculator configured to calculate a dealt price improvement as an amount of the maximum price improvement required to improve a position of a maker quote in the credit-screened queue with respect to other maker quotes at the same price.

2. A system according to claim 1, comprising a computerized deal executor configured to execute a deal at a price equal to the quote price plus the dealt price improvement.

3. A system according to claim 1, wherein the maximum price improvement and the dealt price improvement are expressed in units of price improvement, a unit of price improvement being a fraction of the minimum increment of price of the fungible being traded.

4. A system according to claim 1, wherein the computerized price improvement calculator calculates the dealt price improvement for each quote in the queue.

5. A system according to claim 4, wherein the computerized price improvement calculator calculates the dealt price improvement as the number of time inverted quotes in the credit-screened queue at the same price as the dealt quote, wherein a time inverted quote is a quote higher in the credit-screened queue than an earlier submitted quote at the same price.

6. A system according to claim 1, wherein the computerized price improvement calculator calculates the dealt price improvement by:
setting the dealt price improvement of a quote to zero where all quotes in the queue following the quote have a worse price; otherwise
setting the the dealt price improvement to the dealt price improvement of the next quote in the queue at the same price if the time of the next price is equal to or greater than the time of the quote; otherwise
setting the dealt price improvement to the dealt price improvement of the previous quote in the queue plus one price improvement increment.

7. A system according to claim 1, wherein the quote processor forms a credit-screened quote queue common to all traders on the trading system and the dealt price improvement applied to a dealt quote by the computerized price improvement calculator is the same regardless of an identity of a taker trader.

8. A system according to claim 1, wherein the quote processor forms a credit-screened quote queue for each trading floor trading on the trading system, and the computerized price improvement calculator calculates the dealt price improvement to be applied to a quote from the quote queue for the trader taking the quote.

9. A system according to claim 8, wherein the quote processor forms a credit-screened quote queue for each trader taking floor trading on the trading system, the credit-screened quote queue for each trader taking floor including only quotes from maker trading floors with which a corresponding taker trading floor has credit.

10. A system according to claim 9, wherein the quote processor forms a quote queue for each trader trading floor including only maker quotes from the maker trading floors with which bilateral credit exists with the corresponding taker trading floor.

11. A system according to claim 8, comprising a computerized market distributor configured to calculate market views for each trading floor and including the dealt price improvement.

12. A system according to claim 1, wherein the credit-screened quote queue includes a bid quote queue and a sell quote queue.

13. A system according to claim 1, wherein the computerized price improvement calculator calculates a fee for a dealt price improved quote.

14. A system according to claim 1, wherein the computerized price improvement calculator determines the dealt price improvement only from the dealt quote and other quotes following the quote in the credit-screened queue.

15. A system according to claim 1, wherein the computerized price improvement calculator determines a magnitude of the dealt price improvement by an identity of the taker but independently of a volume of a deal.

16. A system according to claim 1 wherein the system is configured to transmit quotes having a maximum price improvement to taker trading stations such that the quotes having the maximum price improvement are displayed in a manner that differentiates from a quote having no maximum price improvement.

17. A system according to claim 16, wherein the differentiation comprises an icon displayed proximate the quote having the maximum price improvement.

* * * * *